United States Patent
Geiger et al.

(10) Patent No.: US 11,662,707 B2
(45) Date of Patent: May 30, 2023

(54) SYSTEMS AND METHODS FOR CLOUD-BASED EXPERTISE DELIVERY VIA APIS

(71) Applicant: Hypertherm, Inc., Hanover, NH (US)

(72) Inventors: Douglas B. Geiger, Akron, NY (US); Richard Adams, Norwich, VT (US); Nicholas A. Rosenberg, Lockport, NY (US); Mark Schuessler, Pearland, TX (US); Abhi Sharma, Lebanon, NH (US); Kori Joyce, Springfield, VT (US); Chhoeun Sann, Lebanon, NH (US); Corey Brabant, Canaan, NH (US); Julia Johns, Lebanon, NH (US); Matt Howe, Dorchester, NH (US); Harrison Saturley-Hall, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 637 days.

(21) Appl. No.: 16/785,027

(22) Filed: Feb. 7, 2020

(65) Prior Publication Data

US 2020/0257264 A1  Aug. 13, 2020

Related U.S. Application Data

(60) Provisional application No. 62/802,413, filed on Feb. 7, 2019.

(51) Int. Cl.
*G05B 19/4093* (2006.01)

(52) U.S. Cl.
CPC ............ *G05B 19/4093* (2013.01); *G05B 2219/33002* (2013.01); *G05B 2219/34256* (2013.01); *G05B 2219/34282* (2013.01); *G05B 2219/35012* (2013.01)

(58) Field of Classification Search
None
See application file for complete search history.

(56) References Cited

U.S. PATENT DOCUMENTS

| | | | |
|---|---|---|---|
| 8,338,739 B2 | 12/2012 | Lindsay et al. | |
| 8,354,609 B2 | 1/2013 | Lindsay et al. | |
| 8,354,610 B2 | 1/2013 | Lindsay et al. | |
| 8,436,270 B2 | 5/2013 | Lindsay et al. | |

(Continued)

FOREIGN PATENT DOCUMENTS

| | | |
|---|---|---|
| CN | 105103486 A | 11/2015 |
| WO | 2015057301 A1 | 4/2015 |

*Primary Examiner* — Sean Shechtman
(74) *Attorney, Agent, or Firm* — Cesari and McKenna, LLP

(57) ABSTRACT

A method for processing a part from a workpiece using an industrial cutting system. The method includes receiving first data corresponding to the part to be processed from the workpiece using the industrial cutting system. The method further includes receiving second data corresponding to expertise data generated over a time period. The method also includes identifying features of the part based on the first data and the second data. The method further includes generating a part program design including geometry data and processing parameters for at least one of the features of the part. The method also includes processing the part from the workpiece using the industrial cutting system based on the part program design.

14 Claims, 8 Drawing Sheets

(56) References Cited

U.S. PATENT DOCUMENTS

| | | |
|---|---|---|
| 8,541,711 B2 | 9/2013 | Lindsay et al. |
| 8,710,395 B2 | 4/2014 | Lindsay et al. |
| 10,334,048 B2 | 6/2019 | Maturana et al. |
| 10,348,581 B2 | 7/2019 | Maturana et al. |
| 2002/0035450 A1* | 3/2002 | Thackston ......... G05B 19/4099 703/1 |
| 2017/0032281 A1 | 2/2017 | Hsu |
| 2017/0036288 A1 | 2/2017 | Albrecht et al. |
| 2018/0107193 A1 | 4/2018 | Henning et al. |

* cited by examiner

SYSTEMS AND METHODS FOR CLOUD-BASED EXPERTISE DELIVERY VIA APIS

CROSS REFERENCE TO RELATED APPLICATION

This application claims the benefit of and priority to U.S. Provisional Patent Application No. 62/802,413, filed Feb. 7, 2019, the entire contents of which are owned by the assignee of the instant application and incorporated herein by reference in their entirety.

FIELD OF THE INVENTION

The present invention relates generally to manufacturing processing systems, including systems and methods for determining operating parameters of industrial cutting systems using cloud-based expertise.

BACKGROUND OF THE INVENTION

Currently in automated material processing (e.g., cutting) systems and operations there exist a number of problems that limit productivity, flexibility, and effectiveness of these automated cutting systems. In some cases, end users do not have access to the very latest software-based technologies, this occurring because some partners choose not to (or simply are not able to) implement updated techniques. In some other cases, end users who implement software-based techniques do so improperly or incompletely due to their misunderstanding or lack of capability/software proficiency. In yet some other instances, end users that use automated cutting techniques rarely stay up-to-date with any corrections or enhancements that are made over time, delaying updates or not accessing them entirely.

Further, the current state of communication in the automated cutting system field is largely one directional, with updates and information going from suppliers to end users and systems in specific channels. Rarely does any information (e.g., expertise) flow back to the suppliers (e.g., for these suppliers to learn from and enhance product offerings and updates) and/or a global network to be disseminated/shared with the automated cutting system community at large. As a result, there is a lack of collaboration and collaborative expertise growth in the field; each bit of expertise being applied to a system stays only with that system, essentially siloed from the global automated cutting community and hindering suppliers efforts to learn how end users are using their products and where upgrades and improvements in performance are possible.

Therefore, there is a need to create a system that would ensure that end users are using optimal cutting parameters with supplier systems, and that those parameters are always current. Currently, the only way for end users to get these optimal parameters is by using a supplier's software, a supplier's controls, or via licensing. This licensing relies on partner implementation, which is often implemented sub-optimally and in an incomplete or incorrect manner.

SUMMARY OF THE INVENTION

Accordingly, an object of the invention is to provide information related to a manufacturing processing operation to an operator of a material processing system. It is an object of the invention to collect expertise data and identify features of parts to be processed that can be optimized using the expertise data. It is an object of the invention to generate part program designs to be performed on a workpiece using the expertise data. It is an object of the invention to process a part by an industrial cutting system using generated part program designs.

In some aspects, a method for generating a part program design for an industrial cutting system using expertise data includes receiving, by a computing device, industrial cutting system data, workpiece data, and part data corresponding to a part to be processed from a workpiece by an industrial cutting system communicatively coupled to the computing device. The method further includes receiving, by an expertise integration system communicatively coupled to the computing device, the industrial cutting system data, workpiece data, and part data using an application program interface. The method also includes identifying, by the expertise integration system, features of the part to be cut by the industrial cutting system based on expertise data and the received industrial cutting system data, workpiece data, and part data. The method further includes generating, by the expertise integration system, a part program design to be performed on the workpiece. The part program design is configured to adjust normal operation of the industrial cutting system during cutting of at least one of the identified features of the part. The method also includes receiving, by the computing device, the generated program design using the application program interface. The method further includes processing the part by the industrial cutting system using the generated part program design.

In some embodiments, the computing device receives the expertise data using a manual data storage device. For example, in some embodiments, the computing device receives the expertise data using the application program interface. In some embodiments, at least one portion of the expertise data is modified using the application program interface. For example, in some embodiments, the at least one portion of the expertise data is modified periodically using the application program interface. In other embodiments, the part data includes an initially designed part program by the computing device.

In other embodiments, the method further includes receiving, by the expertise integration system, usage data of the industrial cutting system using the application program interface. For example, in some embodiments, the expertise data includes the usage data. In some embodiments, the expertise integration system is cloud-based and the expertise data is stored on the cloud. In other embodiments, the industrial cutting system data includes an identification of a specific cutting system equipment. For example, in some embodiments, the identification can include a serial number, a name or type of the equipment, or any other similar identifier.

In some embodiments, the identified features include at least one of a hole, a bevel, or an edge. In other embodiments, the method further includes modifying operation parameters of the industrial cutting system based on the generated part program design. For example, in some embodiments, operation parameters corresponding to only one of the identified features are modified. In other embodiments, operation parameters corresponding to all of the identified features can be modified. In some embodiments, the industrial cutting system can be a plasma arc cutting system, a laser cutting system, or a waterjet system.

In some aspects, a method for processing a part from a workpiece using an industrial cutting system includes receiving first data corresponding to the part to be processed from the workpiece using the industrial cutting system. The method further includes receiving second data corresponding to expertise data generated over a time period. The method also includes identifying features of the part based on the first data and the second data. The method further includes generating a part program design including geometry data and processing parameters for at least one of the identified features of the part. The method also includes processing the part from the workpiece using the industrial cutting system based on the part program design.

In some embodiments, the industrial cutting system is communicatively coupled to an expertise integration system using an application program interface. In some embodiments, the first data includes industrial cutting system data, workpiece data, and part data corresponding to the part to be processed from the workpiece by the industrial cutting system. For example, in some embodiments, the part data includes an initially designed part program. In other embodiments, the industrial cutting system data includes an identification of a specific industrial cutting system equipment. In some embodiments, the workpiece data includes a material type of the workpiece.

In some embodiments, the second data includes usage data of the industrial cutting system. In other embodiments, the expertise data is stored on the cloud. For example, in some embodiments, the method further includes modifying the expertise data over the time period. In some embodiments, the identified features of the part include at least one of a hole, a bevel, or an edge. In other embodiments, the method further includes processing the first data into third data. The third data can be processed in order to improve the compatibility with the second data. For example, in some embodiments, the method further includes identifying the features of the part based on the second data and the third data.

In some embodiments, the processing parameters include at least one of a torch speed, a torch height, a torch motion, a gas type, a gas flow rate, or an amperage. For example, the torch motion can correspond to a lead and/or run out for a feature to be cut from the part. In some embodiments, the processing parameters are generated for one of the identified features of the part. In other embodiments, the processing parameters are generated for all of the identified features of the part. In some embodiments, processing the part from the workpiece further includes processing at least one of the features using the geometry data and first processing parameters. In some embodiments, the industrial cutting system can be a plasma arc cutting system, a laser cutting system, or a waterjet system.

In some aspects, a system for processing a part from a workpiece using an industrial cutting system includes an expertise integration system communicatively coupled to the industrial cutting system. The industrial cutting system is configured to process the part from the workpiece based on a part program design. The expertise integration system is configured to receive first data corresponding to the part to be processed from the workpiece using the industrial cutting system. The expertise integration system is also configured to receive second data corresponding to expertise data generated over a time period. Further, the expertise integration system is configured to identify features of the part based on the first data and the second data. The expertise integration system is also configured to generate the part program including geometry data and processing parameters for at least one of the features of the part.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for providing information related to a manufacturing processing operation to an operator of a material processing system. The system and methods can include one or more mechanisms or methods for collecting expertise data and identifying features of parts to be processed that can be optimized using the expertise data. The system and methods can include one or more mechanisms or methods for generating part program designs to be performed on a workpiece using the expertise data. The system and methods can include one or more mechanisms or methods for processing a part by an industrial cutting system using generated part program designs.

The invention solves the above problems and provides an enhanced end user experience and final cut workpiece by storing core elements of supplier expertise in the cloud (or a network location at an end user's site) where they can be implemented, accessed, and delivered via Application Program Interfaces (APIs). There are multiple commercial approaches for this concept: develop these applications and use them with a supplier's own software and hardware platforms to create an enhanced value proposition; deploy applications for use by supplier partners to enhance their experience working with supplier products; and/or deploy these applications directly to end users. One way to deliver supplier expertise is via cloud applications. Core elements of supplier expertise can be implemented in the cloud, accessed, and delivered via Application Program Interfaces (APIs). For example, an application that has been developed in this manner is Hypertherm's XPR True Hole Conversion utility. This conversion utility is stored on the cloud and can be accessed by and delivered to a system in the field via an API at any time. In general, expertise data includes advanced techniques, such as true hole code and/or bevel code, that can enhance part program designs. In other embodiments several other utilities and expertise (e.g., expertise data) can be stored on the cloud for access by remote systems, these utilities and expertise can include: Hypertherm's SureCut delivery for True Bevel, Rapid Part, etc.; consumable analytics tied to RFID data; job tracking and scheduling; cost and quote calculations; nesting and plate/part optimization (using parameters or nesting calculations stored in the cloud), etc.

Figure 1:
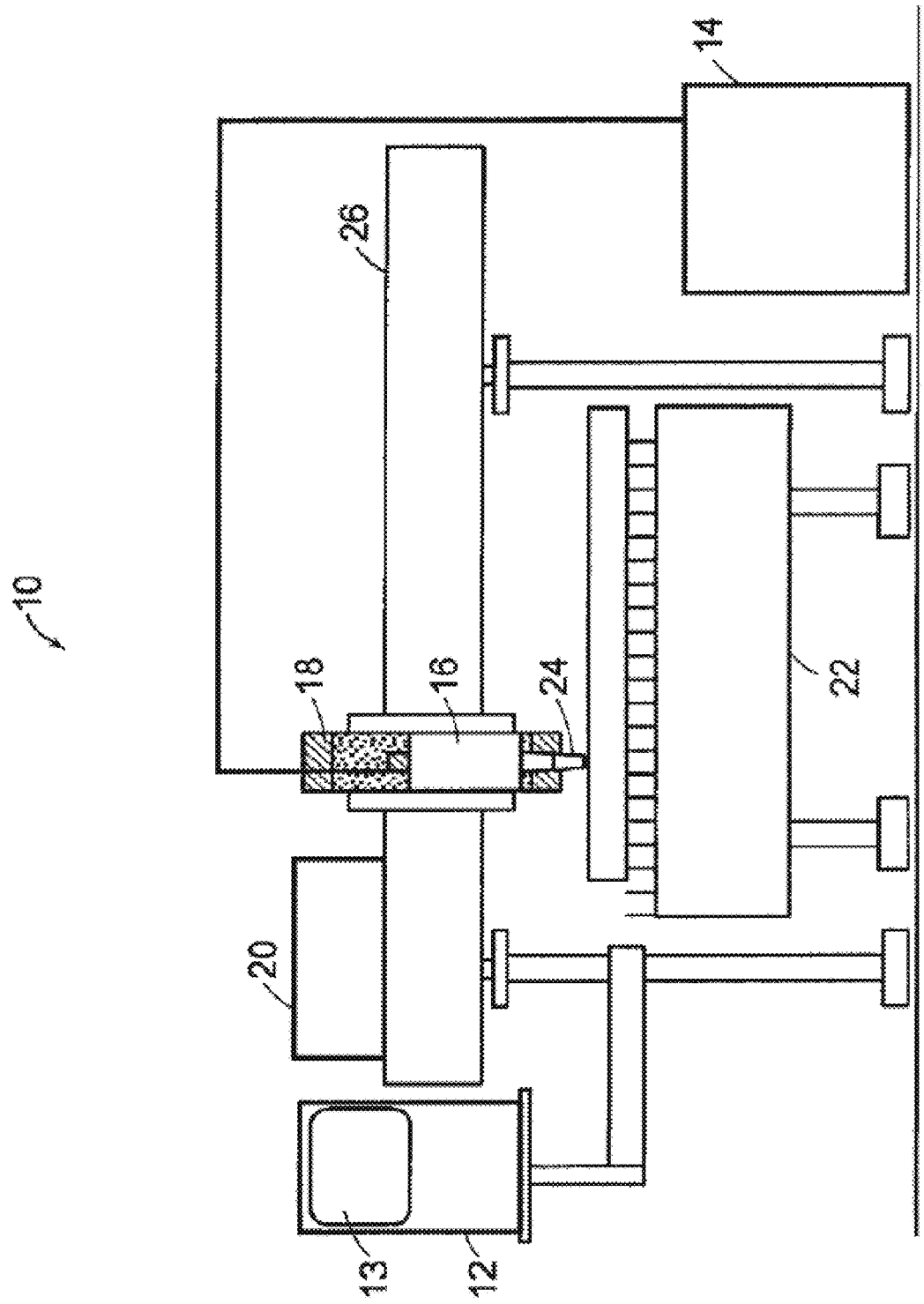
FIG. 1 is an illustrative representation of a known industrial cutting system, shown a torch mounted on a table.

For reference, FIG. 1 is a diagram of a known industrial cutting system, specifically, an automated plasma torch system. Automated torch system 10 can include a cutting table 22 and torch 24. An example of a torch that can be used in an automated system is the HPR260 auto gas system manufactured by Hypertherm®, Inc., of Hanover, N.H. The torch height controller 18 is then mounted to a gantry 26. The automated system 10 can also include a drive system 20. The torch is powered by a power supply 14. An automated torch system 10 can also include a computer numeric controller 12 (CNC), for example, a Hypertherm Automation Voyager, XPR, or EDGE Connect, manufactured by Hypertherm®, Inc., of Hanover, N.H. The CNC 12 can include a display screen 13 which is used by the torch operator to input or read information that the CNC 12 uses to determine operating parameters. In some embodiments, operating parameters can include cut speed, torch height, and plasma and shield gas composition. The display screen 13 can also be used by the operator to manually input operating parameters. A torch 24 can also include a torch body (not shown) and torch consumables that are mounted to the front end of a torch body. Further discussion of CNC 12 configuration can be found in U.S. Patent Publication No. 2006/0108333, assigned to Hypertherm®, Inc., the entirety of which is incorporated herein by reference.

Figure 2:
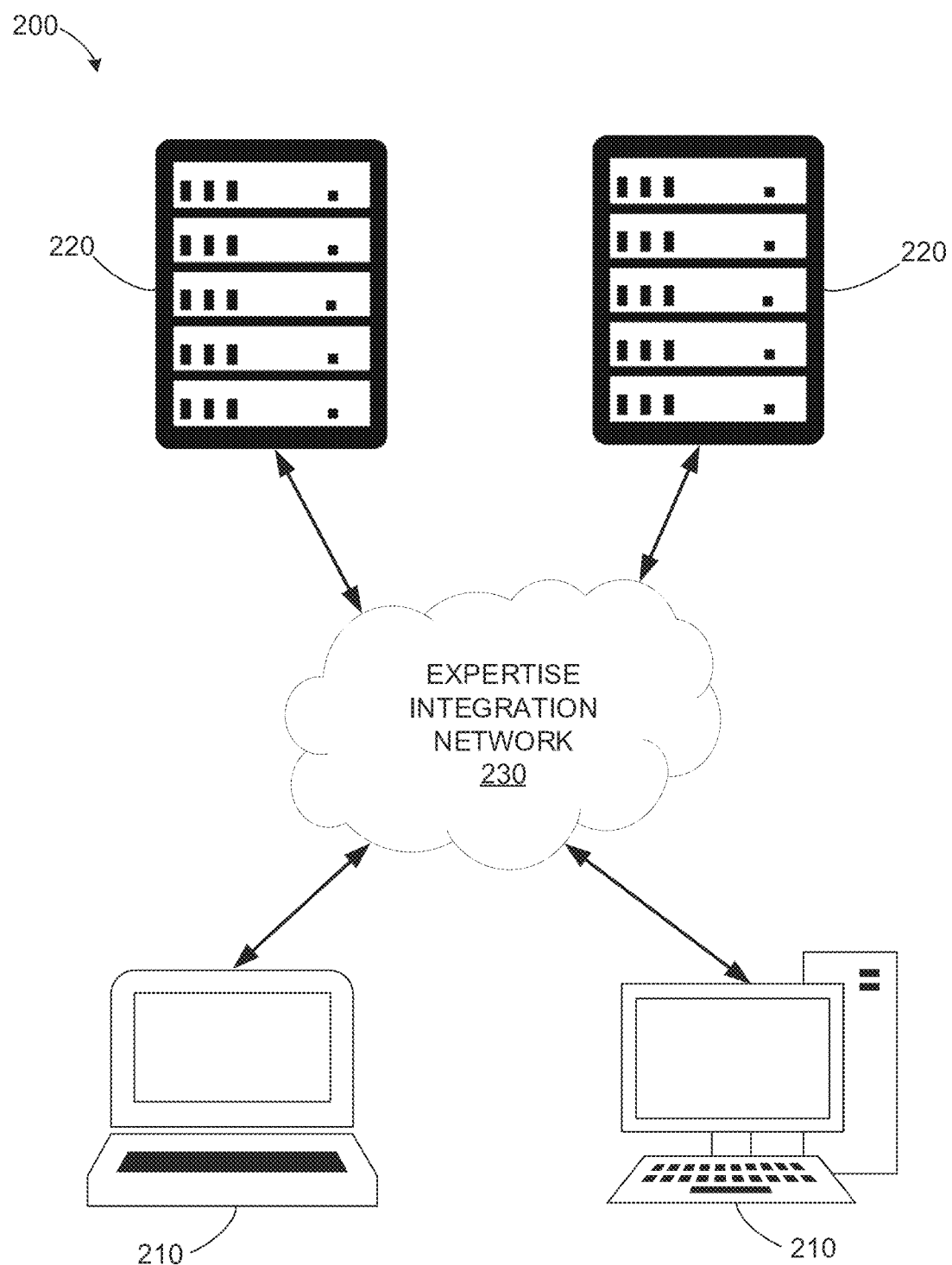
FIG. 2 is an illustrative representation of an expertise integration system communicatively coupled to the industrial cutting system shown in FIG. 1, according to an embodiment of the invention.
Figure 3:
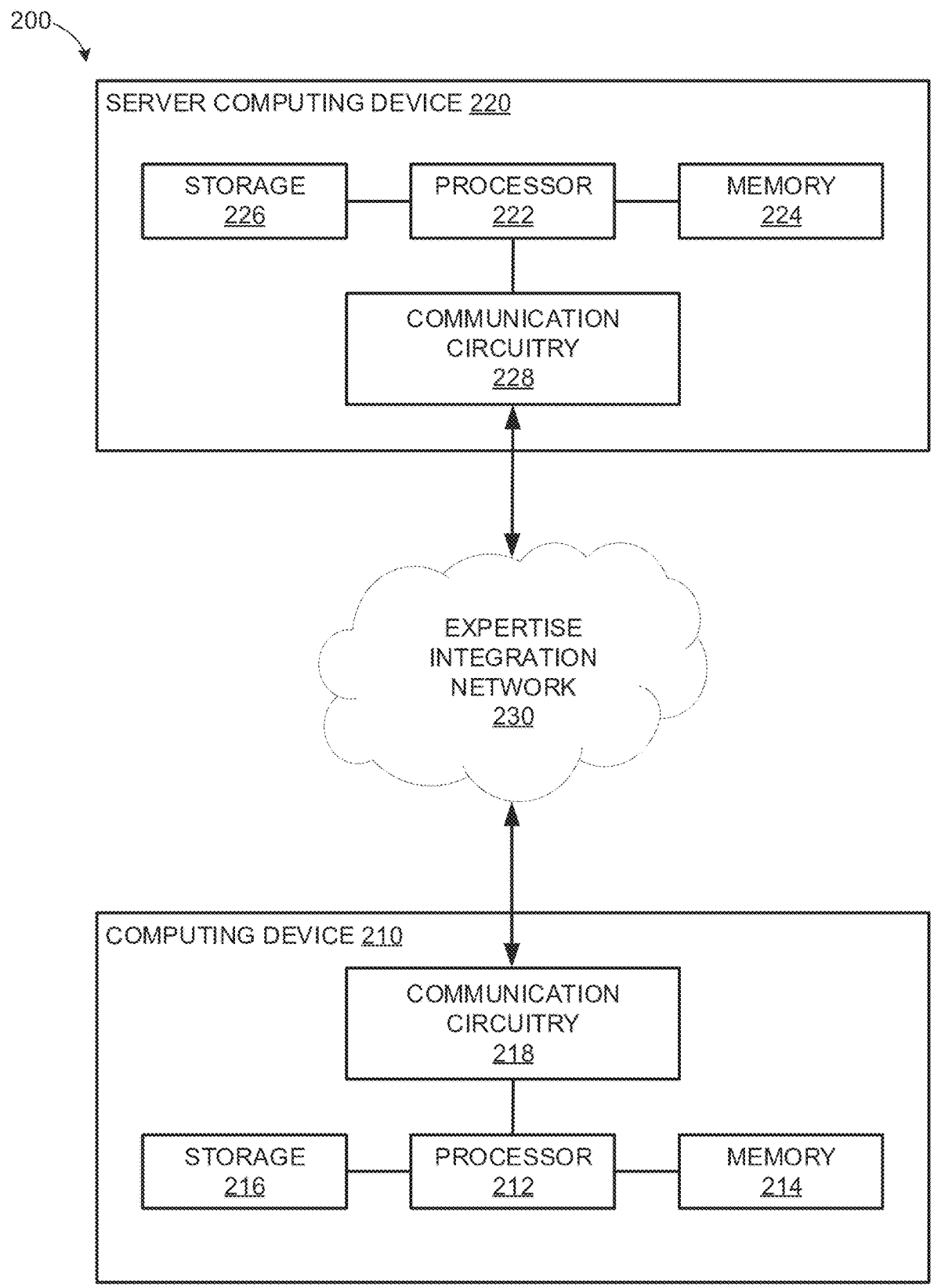
FIG. 3 is an illustrative representation of the expertise integration system shown in FIG. 2, according to an embodiment of the invention.

Referring to FIGS. 2-3, an expertise integration system 200 includes one or more computing devices 210 communicatively coupled to one or more server computing devices 220 via an expertise integration network 230. For example, computing device 210 can be a computer numeric controller (CNC) or an automated processing system. Each server computing device 220 can include a processor 222, memory 224, storage 226, and communication circuitry 228. Each computing device 210 can include a processor 212, memory 214, storage 216, and communication circuitry 218. In some embodiments, communication circuitry 218 of the server computing devices 220 is communicatively coupled to the communication circuitry 228 of the computing devices 210 via expertise integration network 230. Communication circuitry 218 and communication circuitry 228 can use Bluetooth, Wi-Fi, Ethernet, wired LAN, or any comparable data transfer connection. The computing devices 210 can include personal workstations, laptops, tablets, mobile devices, or any other comparable device.

One advantage of storing and accessing such expertise and utilities on the cloud is the speed and processing power thereby available to the system compared to previous locally stored systems which are limited in processing power by the computing power of the CNC (computer numerical control system) itself. With the cloud access, conversions of files and part processing can take advantage of much faster and larger processing power through the cloud to create the part program and then simply relay it to the CNC for performance rather than creation (e.g., the CNC processor is not burdened with having to do all of the processing to create the part program). For example, with the previously discussed XPR True Hole Conversion utility stored on the cloud, conversion of the command to a part program may happen about five times faster in the cloud than with previous solutions that were simply executables loaded directly on to the CNC in the field.

Figure 4:
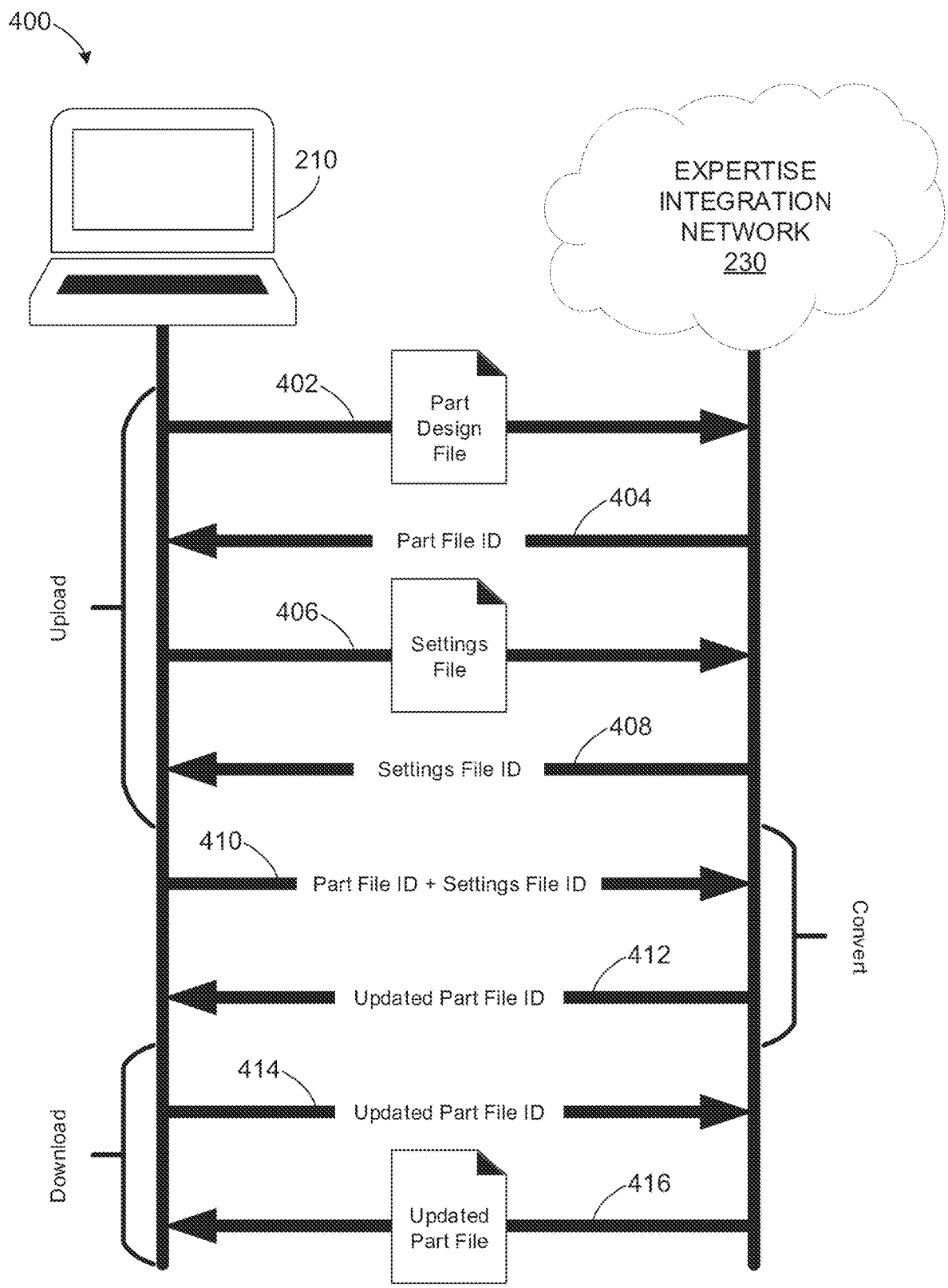
FIG. 4 is an illustrative representation of an exemplary process flow using the exemplary expertise integration system shown in FIGS. 2-3, according to an embodiment of the invention.
Figure 5:
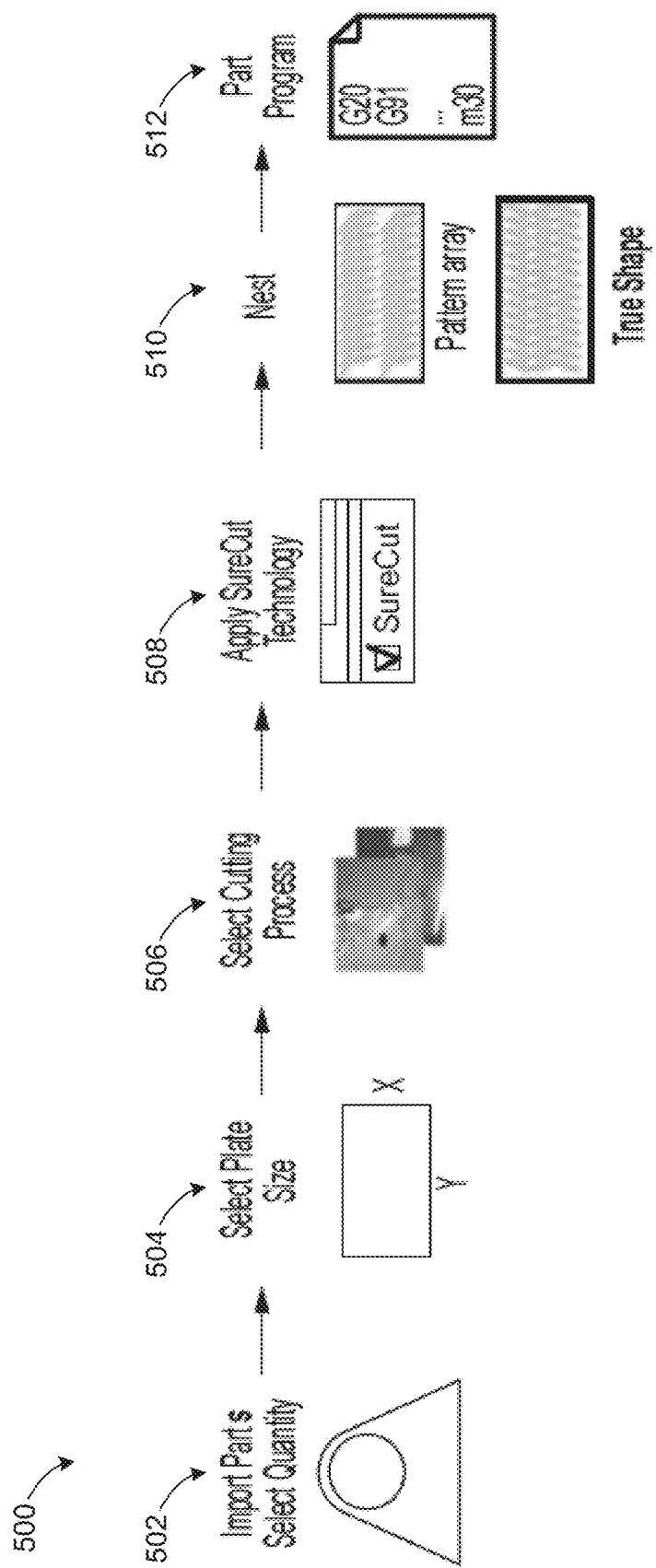
FIG. 5 is an illustrative representation of an exemplary process flow using the exemplary expertise integration system shown in FIGS. 2-3, according to an embodiment of the invention.

FIGS. 4-5 illustrate example process flows of expertise integration system 200. Referring to FIG. 4, part file creation is achieved via both the automated cutting system and the cloud. In the embodiment of FIG. 4, decisions and processing operations are divided between the computing device 210 and expertise integration system 200 to optimize the processing of the part file and to integrate/apply expertise to the finished product. Through this connectivity and the central location provided by the invention a number of benefits can be gained and leveraged with one another. For example, at step 402, the part design file can be uploaded from the computing device 210 to the expertise integration network 230. Once uploaded, the expertise integration system 200 generates a part file ID which is received by the computing device 210 at step 404. Similarly, at step 406, the settings file can be uploaded from the computing device 210 to the expertise integration network 230. Once uploaded, the expertise integration system 200 generates a settings file ID which is received by the computing device 210 at step 408.

Once the file upload is complete, the computing device 210 can request conversion and optimization of compatible part features; the expertise integration network 230 receives the part file ID and settings file ID which allows the expertise integration system 200 to generate an updated part file at step 410. Once generated, the computing device 210 receives an updated part file ID at step 412. At step 414, computing device 414 can request to download the updated part file; the expertise integration network 230 receives the updated part file ID. Finally, computing device 210 downloads the updated part file from the expertise integration network 230 at step 416.

In some embodiments, the cloud applications can be updated in a central location and the end user will always be using the most up to date and advanced data and techniques. Additionally, from this central location, access to supplier and/or global expertise can be given to anyone with a valid license. This includes end users, partners, and 3rd party software providers. Once integration work with the API is completed up-front the connection is dynamic. This connection allows end users to experience the full capabilities of their systems by having ready access to the latest optimal parameters. Further, controls and CAM software will be enhanced by taking advantage of the power of cloud computing.

In some embodiments, by accessing the cloud via APIs, usage data can be analyzed for further use. This includes use on the micro level (for a particular user) or macro level (for summary data of more than one end user). This data can then be used for corrective maintenance, predictive maintenance, supplier engineering design or a variety of other uses. This utilization of the cloud to deliver supplier expertise to channel partners, end users, and 3rd party software suppliers provides a host of benefits to both end users and suppliers. The cloud application may include utilities and expertise relative to any of plasma processes, waterjet processes, laser processes, oxyfuel processes, etc., and may at once share desirable programs and amounts of data with applicable systems and operations.

In the embodiment of FIG. 5, the expertise integration system 200 is responsive to machine and environmental changes while remaining flexible to varied tasks both while online and offline. FIG. 5 illustrates a process flow for creating a part program for a desired part, according to embodiments of the invention. FIG. 5 walks through part program creation utilizing cloud expertise via a simple flow through to show each step in part program creation to optimize processes and apply the latest learnings and updates to each process. For example, at step 502, the expertise integration system 200 imports a part file corresponding to a part to be processed from a workpiece. The part file can be a dxf, dwg, cam, or DGN type file. In some embodiments, the part file can be either a single part file or multiple part files. At steps 504 and 506, the workpiece or plate size is selected and the cutting process is selected, respectively. In some embodiments, the cutting process can be one of waterjet, plasma, or oxyfuel processes.

At step 508, the expertise integration system 200 can optimize and enhance the compatible features of the part file. In some embodiments, the expertise integration system 200 can apply SureCut Technology to the part file. For example, the spacing, lead-ins, cut chart selection, true hole, rapid part, abrasive feed rates, and corner ramping can be optimized. Once optimized, the expertise integration system 200 can nest the enhances features into the part program file at step 510. Finally, at step 512, the updated part program file is available for use during a cutting process.

The expertise integration system 200 allows for enhanced features which can be available even offline such as job tracking and queuing. Further, even non-directly cloud connected systems benefit from the expertise integration system 200 via the shared database which can in turn be relayed to end users and systems in the field via periodic software updates, flash drives, etc. The expertise integration system 200 also allows for inventory management and/or nesting and scrap/remnant considerations to be factored into process decisions and designs by expertise from the cloud both when a given system is online or even if it is offline. Further, in some embodiments, expertise integration system 200 allows for improvement and/or optimization of non-supplier part programs. For example, expertise integration system 200 can apply expertise to a part program originally generated via a software program in order to update the non-optimized part program (e.g., identifying true hole use possibilities in a part, collision avoidance, material considerations, system condition considerations, etc.).

As shown in FIGS. 4-5, expertise integration system 200 uses expertise data stored in the cloud to generate an enhanced part program design. The expertise integration system 200 receives the original part program and converts the CNC code to a mathematical model, enabling analysis of the geometry. This conversion is performed through pattern matching of the CNC code against a list of expected CNC codes and formats. As each line is analyzed, it is converted to zero or more tokenized elements. These elements account for things such as torch on and off codes, kerf offset codes, and motions. Each complete profile is analyzed for compatibility with True Hole parameters. For example, in some embodiments, the expertise integration system 200 looks at profile shape, number of motions, material type, material thickness, amperage, and hole diameter relative to material thickness.

Once this analysis is complete, non-eligible geometries are not modified and compatible geometries are modified. For example, the compatible geometries are modified by adjusting the lead-in geometry, breaking up the motion(s) of the geometries into multiple pieces, and inserting torch speed control codes, motion control codes, gas control codes, amperage control codes, etc., into the modified geometry. The expertise integration system 200 can then convert the adjusted geometries back to CNC code via pattern matching using an acceptable code model stored in the settings file. When the entire file has been processed, it is made available to the user via the cloud API. Further discussion of Hypertherm's XPR True Hole Conversion utility can be found in U.S. Pat. Nos. 8,354,609, 8,354,610, 8,541,711, 8,338,739, 8,436,270, and 8,710,395, assigned to Hypertherm®, Inc., the entireties of which are incorporated herein by reference.

Figure 6:
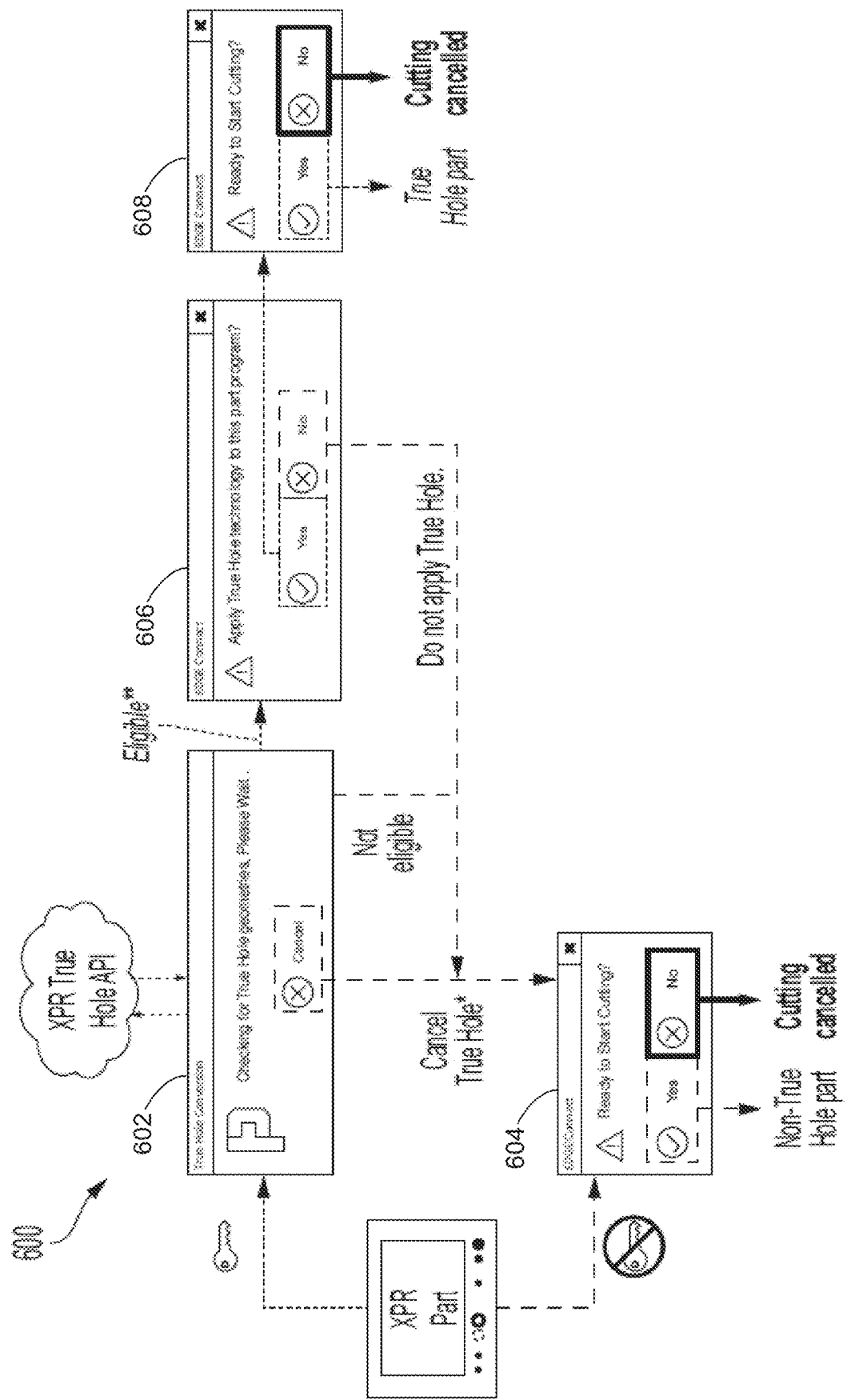
FIG. 6 is an illustrative representation of an exemplary process flow using the exemplary expertise integration system shown in FIGS. 2-3, according to an embodiment of the invention.

FIG. 6 illustrates an embodiment of the invention where an end user is attempting to cut a hole in a workpiece and the system is determining the appropriate course of action to give an improved and/or optimized result to the end user. The figure graphically displays the CNC side dialog possibilities/progressions of the command including consulting with the cloud for expertise injection. As can be seen in FIG. 6, a number of decisions and processes can still be handled/performed by the CNC. However, a number of decisions can be turned over to the cloud to alleviate some of the harder processing on the CNC and to access a wealth of combined knowledge and expertise.

For example, at dialog box 602, the expertise integration system 200 is checking for eligible features or True Hole geometries that can be enhanced. If the end user cancels the eligibility check, the user is presented with dialog box 604. Dialog box 604 allows the end user to start cutting the part without True Hole conversion, or cancel the cutting process. If the expertise integration system 200 identifies eligible features, the end user is presented with dialog box 606, which allows the end user to select whether they want expertise integration system 200 to apply True Hole technology to the part program. If the end user chooses to convert the part program file into an optimized part program file, the end user is presented with dialog box 608. Dialog box 608 allows the end user to begin cutting the part using the updated program part file, or cancel the cutting process. Otherwise, the end user is presented with dialog box 604.

Figure 7:
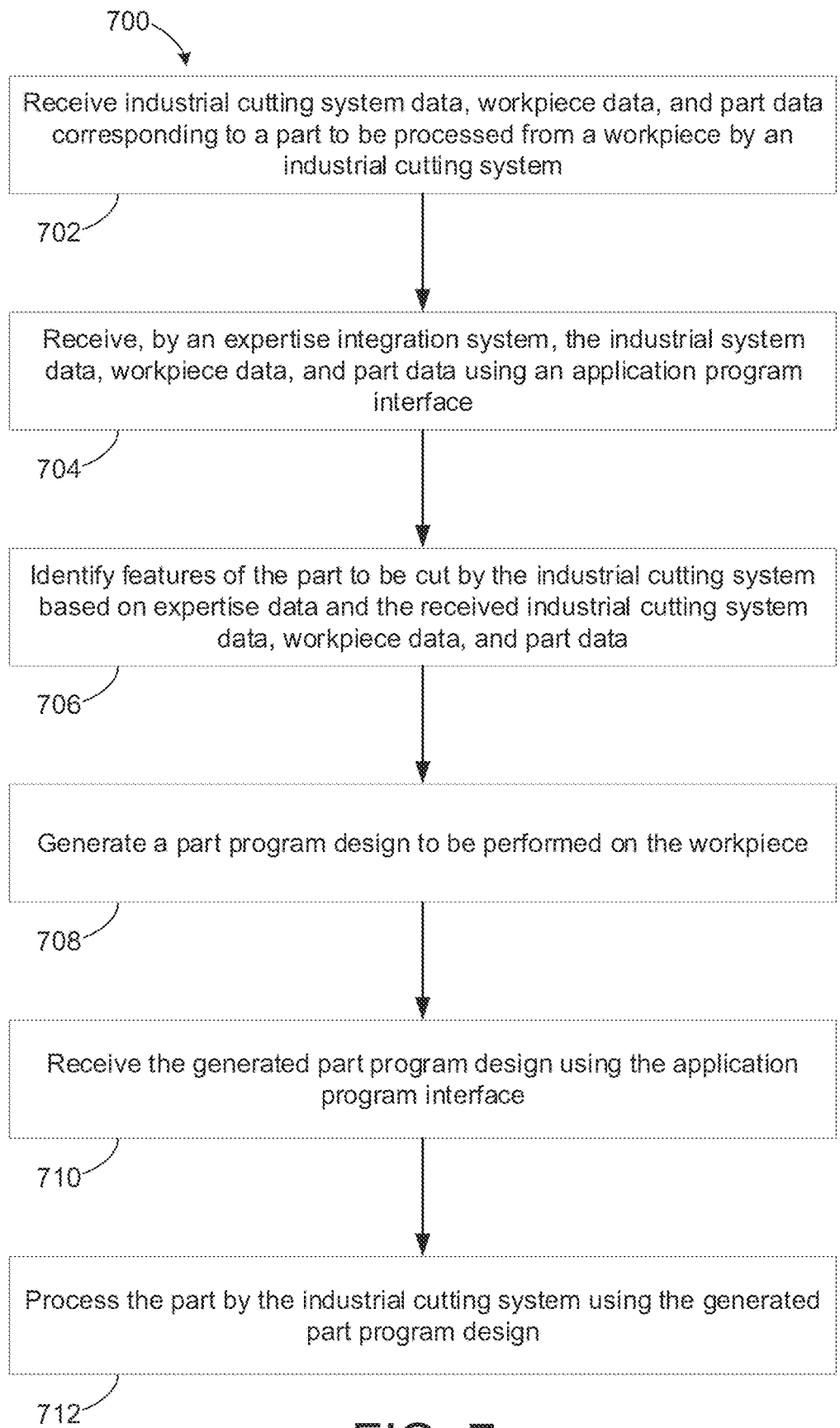
FIG. 7 is a flow diagram of method steps for generating a part program design using the exemplary expertise integration system shown in FIGS. 2-3, according to an embodiment of the invention.

Referring to FIG. 7, a process 700 for generating a part program design for an industrial cutting system 10 using expertise data is illustrated. The process 700 begins by receiving, by a computing device 210, industrial cutting system data, workpiece data, and part data corresponding to a part to be processed from a workpiece by an industrial cutting system 10 communicatively coupled to the computing device 210 in step 702. For example, in some embodiments, the part data includes an initially designed part program by the computing device 210. In some embodiments, the computing device 210 receives the expertise data using an application program interface. In other embodiments, the computing device 210 receives the expertise data using a manual storage device. For example, in some embodiments, the computing device 210 can modify at least one portion of the expertise data using the application program interface. The computing device 210 can modify the at least one portion of the expertise data based on usage data or conditions data. This exemplary embodiment allows the at least one portion of the expertise data to be modified periodically using the application program interface.

Process 700 continues by receiving, by an expertise integration system 200 communicatively coupled to the computing device 210, the industrial cutting system data, workpiece data, and part data using an application program interface in step 704. As discussed in relation to FIGS. 4-5, in some embodiments, the expertise integration system 200 receives the original part program and converts the CNC code to a mathematical model, enabling analysis of the geometry. For example, in some embodiments, the expertise integration system 200 is cloud-based. In other embodiments, process 700 includes receiving, by the expertise integration system 200, usage data of the industrial cutting system 10 using the application program interface. In some embodiments, the industrial cutting system data includes an identification of a specific cutting system equipment. For example, in some embodiments, the identification can include a serial number, a name or type of the equipment, or any other similar identifier.

Process 700 continues by identifying, by the expertise integration system 200, features of the part to be cut by the industrial cutting system 10 based on expertise data and the industrial cutting system data, workpiece data, and part data in step 706. As discussed in relation to FIGS. 4-5, in some embodiments, the expertise integration system 200 looks at profile shape, number of motions, material type, material thickness, amperage, and hole diameter relative to material thickness. For example, the expertise data can include usage data of the industrial cutting system 10. In some embodiments, the expertise data is stored on the cloud. In some embodiments, the identified features include at least one of a hole, a bevel, or an edge.

Process 700 continues by generating, by the expertise integration system 200, a part program design to be performed on the workpiece in step 708. The part program design can be configured to adjust normal operation of the industrial cutting system 10 during cutting of at least one of the identified features of the part. As discussed in relation to FIGS. 4-5, in some embodiments, expertise integration system 200 modifies the identified features of the part by adjusting the lead-in geometry, breaking up the motion(s) of the geometries into multiple pieces, and inserting torch speed control codes, motion control codes, gas control codes, amperage control codes, etc. into the modified geometry. In other embodiments, the expertise integration system 200 modifies operation parameters of the industrial cutting system 10 based on the generated part program design. For example, in some embodiments, operation parameters corresponding to only one of the identified features are modified. In other embodiments, operation parameters corresponding to all of the identified features can be modified.

Process 700 continues by receiving, by the computing device 210, the generated part program design using the application program interface in step 710. Process 700 finishes by processing the part by the industrial cutting system 10 using the generated part program design in step 712. For example, the industrial cutting system 10 can be a plasma arc cutting system, a laser cutting system, or a waterjet system.

Figure 8:
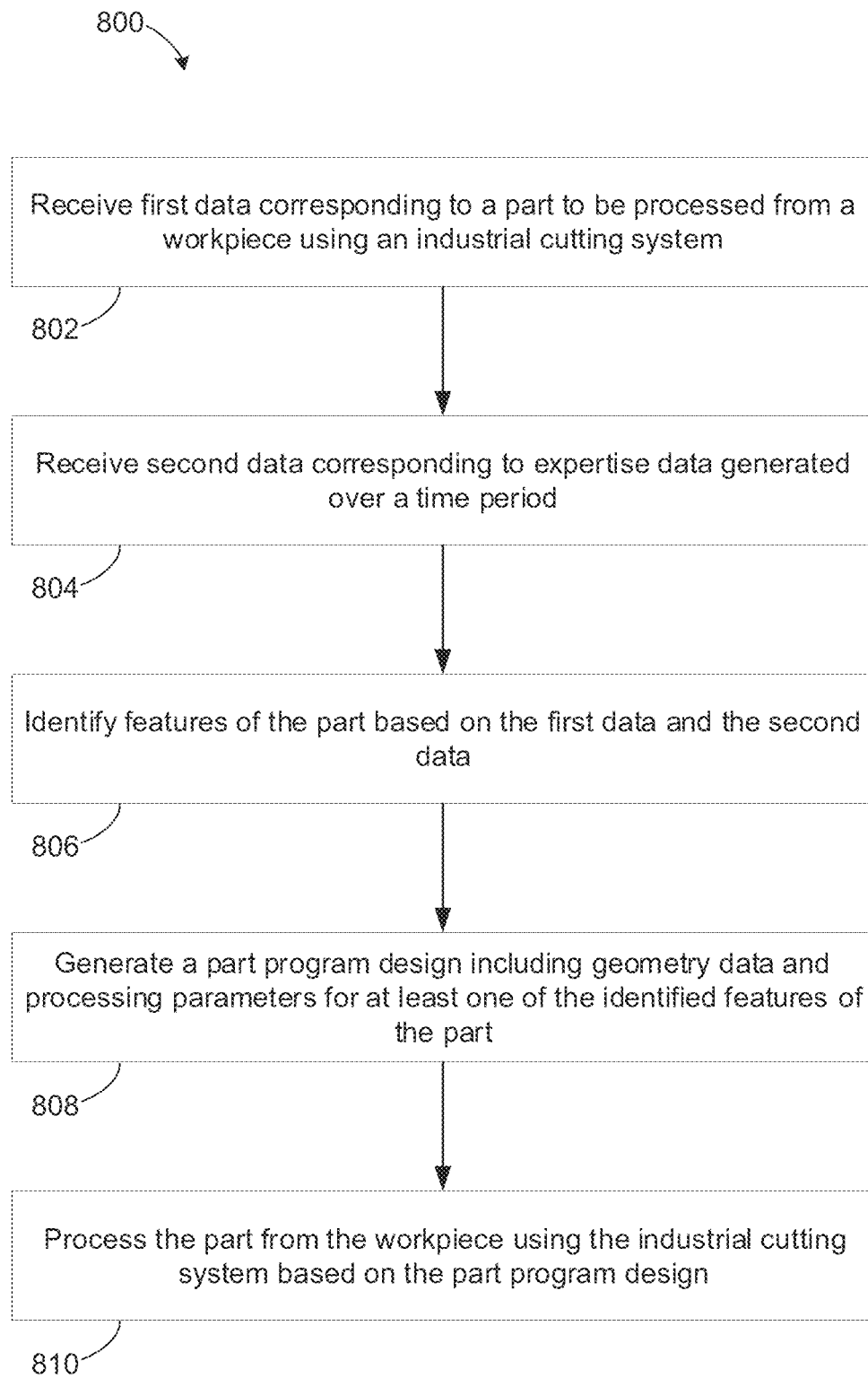
FIG. 8 is a flow diagram of method steps for processing a part from a workpiece using the exemplary industrial cutting system shown in FIG. 1 and the exemplary expertise integration system shown in FIGS. 2-3, according to an embodiment of the invention.

Referring to FIG. 8, a process 800 for processing a part from a workpiece using an industrial cutting system 10 is illustrated. The process 800 begins by receiving first data corresponding to the part to be processed from the workpiece using the industrial cutting system 10 in step 802. For example, in some embodiments, the industrial cutting system 10 is communicatively coupled to an expertise integration system 200 using an application program interface. In some embodiments, the first data includes industrial cutting system data, workpiece data, and part data corresponding to the part to be processed from the workpiece by the industrial cutting system 10. For example, in some embodiments, the part data includes an initially designed part program. In other embodiments, the industrial cutting system data includes an identification of a specific industrial cutting system equipment. In some embodiments, the workpiece data includes a material type of the workpiece.

Process 800 continues by receiving second data corresponding to expertise data generated over a time period in step 804. For example, in some embodiments, the second data includes usage data of the industrial cutting system 10. In some embodiments, the expertise data includes true hole code or bevel code. In other embodiments, the expertise data is stored on the cloud. For example, in some embodiments, expertise integration system 200 modifies the expertise data over the time period. In some embodiments, the time period can range on the order of hours, days, months, or years.

Process 800 continues by identifying features of the part based on the first data and the second data in step 806. For example, in some embodiments, the identified features of the part include at least one of a hole, a bevel, or an edge. In other embodiments, expertise integration system 200 processes the first data into third data. The third data can be processed in order to improve the compatibility with the second data. For example, in some embodiments, expertise integration system 200 identifies the features of the part based on the second data and the third data.

Process 800 continues by generating a part program comprising geometry data and processing parameters for at least one of the identified features of the part in step 808. For example, in some embodiments, the processing parameters include at least one of a torch speed, a torch height, a torch motion, a gas type, a gas flow rate, or an amperage. For example, the torch motion can correspond to a lead-in and/or run out for a feature to be cut from the part. In some embodiments, the processing parameters are generated for one of the identified features of the part. In other embodiments, the processing parameters are generated for all of the identified features of the part.

Process 800 finishes by processing the part from the workpiece using the industrial cutting system 10 based on the part program design in step 810. In some embodiments, processing the part from the workpiece further includes processing at least one of the features using the geometry data and first processing parameters. In some embodiments, the industrial cutting system 10 can be a plasma arc cutting system, a laser cutting system, or a waterjet system.

In some aspects, a system for processing a part from a workpiece using an industrial cutting system 10 includes an expertise integration system 200 communicatively coupled to the industrial cutting system 10. The industrial cutting system 10 is configured to process the part from the workpiece based on a part program design. The expertise integration system 200 is configured to receive first data corresponding to the part to be processed from the workpiece using the industrial cutting system 10. The expertise integration system 200 is also configured to receive second data corresponding to expertise data generated over a time period. Further, the expertise integration system 200 is configured to identify features of the part based on the first data and the second data. The expertise integration system 200 is also configured to generate the part program including geometry data and processing parameters for at least one of the features of the part.

The systems and methods described herein provide to local CNC systems core elements of supplier expertise on the cloud via APIs for use on manufacturing processing systems connected to the local CNC system. The systems and methods described herein allow for the conversions of files and part processing to be performed on the cloud and relayed to the CAM and/or CNC for performance rather than creation. The systems and methods described herein allow for files and designs to be analyzed on the cloud for opportunities to apply expertise to specific features. The systems and methods described herein allow for decisions and processing operations to be divided between the CNC and the cloud. The systems and methods described herein allow for supplier and/or global expertise to be made available to all on the cloud and continuously evolve. The systems and methods described herein allow for usage data to be analyzed on a micro or macro level for corrective maintenance, predictive maintenance, and/or future design. The systems and methods described herein allow for reprocessing and analyzing of non-supplier part program to apply expertise. The systems and methods described herein allow for dynamic cutchart delivery.

The systems and methods described herein provide a number of benefits over the current state of the art, the advantages including: provides faster conversions and part processing; enables decreased burden on CNC processor; ensures the most up to date version is always available by updated cloud applications in a central location; consistently realizes improvements to part processing; infuses expertise into non-supplier part programs; allowing for offline access to expertise data.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one programmable processor or on multiple programmable processors.

Processors 212 and 222 can perform the above-described method steps by executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors 212 and 222 may include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices 214 and 224 can be used to temporarily store data, such as a cache. Memory devices 214 and 224 can also be used for long-term data storage. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

The components of the expertise integration system 200 can be interconnected by communication circuitries 218 and 228 using transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Communication circuitries 218 and 228 can use one or more communication protocols to transfer information over transmission medium. Communication protocols can include, for example, Ethernet protocol, Internet Protocol (IP), Voice over IP (VOiP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

One skilled in the art will realize the invention can be embodied in other specific forms without departing from the spirit or essential characteristics thereof. The foregoing embodiments are therefore to be considered in all respects illustrative rather than limiting of the invention described herein. It will be appreciated that the illustrated embodiments and those otherwise discussed herein are merely examples of the invention and that other embodiments, incorporating changes thereto, including combinations of the illustrated embodiments, fall within the scope of the invention.

What is claimed:

1. A method for generating a part program design for an industrial cutting system using expertise data, the method comprising:
   receiving, by a computing device, industrial cutting system data, workpiece data, and part data corresponding to a part to be processed from a workpiece by an industrial cutting system communicatively coupled to the computing device;
   receiving, by an expertise integration system communicatively coupled to the computing device, the industrial cutting system data, workpiece data, and part data using an application program interface;
   identifying, by the expertise integration system, a plurality of features of the part to be processed by the industrial cutting system based on expertise data and the received industrial cutting system data, workpiece data, and part data;
   generating, by the expertise integration system, a part program design to be performed on the workpiece, wherein the part program design is configured to adjust normal operation of the industrial cutting system during processing of at least one of the plurality of identified features of the part;
   receiving, by the computing device, the generated part program design using the application program interface; and
   processing the part by the industrial cutting system using the generated part program design.

2. The method of claim 1, further comprising:
   receiving, by the computing device, the expertise data using a manual data storage device.

3. The method of claim 1, further comprising:
   receiving, by the expertise integration system, usage data of the industrial cutting system using the application program interface.

4. The method of claim 3, wherein the expertise data comprises the usage data.

5. The method of claim 1, wherein the plurality of identified features includes at least one of a hole, a bevel, or an edge.

6. The method of claim 1, wherein the part data comprises an initially designed part program by the computing device.

7. The method of claim 1, further comprising:
   receiving, by the computing device, the expertise data using the application program interface.

8. The method of claim 7, further comprising:
   modifying at least one portion of the expertise data using the application program interface.

9. The method of claim 8, wherein the at least one portion of the expertise data is modified periodically using the application program interface.

10. The method of claim 1, wherein the expertise integration system is cloud-based.

11. The method of claim 1, wherein the industrial cutting system data includes an identification of a specific industrial cutting system equipment.

12. The method of claim 1, wherein the expertise data is stored on the cloud.

13. The method of claim 1, wherein the industrial cutting system comprises one of a plasma arc cutting system, a laser cutting system, or a waterjet system.

14. The method of claim 1, further comprising:
   modifying operation parameters of the industrial cutting system based on the generated part program design.

* * * * *